(12) United States Patent
Bednar

(10) Patent No.: US 11,627,737 B2
(45) Date of Patent: Apr. 18, 2023

(54) WILD GAME TOTE WITH INTERCHANGEABLE HUNTING TOOLS

(71) Applicant: James R. Bednar, Mayville, WI (US)

(72) Inventor: James R. Bednar, Mayville, WI (US)

( * ) Notice: Subject to any disclaimer, the term of this patent is extended or adjusted under 35 U.S.C. 154(b) by 897 days.

(21) Appl. No.: 16/558,568

(22) Filed: Sep. 3, 2019

(65) Prior Publication Data

US 2021/0059239 A1 Mar. 4, 2021

(51) Int. Cl.

| | | |
|---|---|---|
| *A01M 31/00* | (2006.01) | |
| *G01G 19/52* | (2006.01) | |
| *G01B 3/04* | (2006.01) | |
| *B24B 3/54* | (2006.01) | |
| *B66F 15/00* | (2006.01) | |
| *C14B 19/00* | (2006.01) | |
| *B67B 7/16* | (2006.01) | |
| *A01K 97/20* | (2006.01) | |
| *G01G 3/02* | (2006.01) | |
| *B23D 61/00* | (2006.01) | |
| *G01C 17/00* | (2006.01) | |
| *B25B 15/00* | (2006.01) | |
| *B25B 13/00* | (2006.01) | |
| *B25D 1/00* | (2006.01) | |

(52) U.S. Cl.
CPC ........... *A01M 31/006* (2013.01); *A01K 97/20* (2013.01); *B24B 3/54* (2013.01); *B66F 15/00* (2013.01); *B67B 7/16* (2013.01); *C14B 19/00* (2013.01); *G01B 3/04* (2013.01); *G01G 3/02* (2013.01); *G01G 19/52* (2013.01); *B23D 61/00* (2013.01); *B25B 13/00* (2013.01); *B25B 15/00* (2013.01); *B25D 1/00* (2013.01); *G01C 17/00* (2013.01)

(58) Field of Classification Search
CPC .................................................... A01M 31/006
See application file for complete search history.

(56) References Cited

U.S. PATENT DOCUMENTS

| | | | | |
|---|---|---|---|---|
| 2,394,805 A | * | 2/1946 | Reishus | A01M 31/006 224/663 |
| 3,096,010 A | | 7/1963 | Rasmussen | |
| 3,188,130 A | * | 6/1965 | Pietrowicz | A22B 5/06 D22/199 |
| 3,223,189 A | * | 12/1965 | Robbins | A01K 77/00 177/245 |

(Continued)

*Primary Examiner* — Derek J Battisti
(74) *Attorney, Agent, or Firm* — Wozny Law, LLC; Thomas M. Wozny

(57) ABSTRACT

A multi-functional wild game tote that functions not only as a lightweight, convenient and compact carrier for one or more game animals such as birds, small mammals and fish harvested in the wild, but also as a multi-purpose tool having numerous interchangeable hunting tools useful when hunting wild game, especially wild turkeys. The carrier function of the wild game tote is provided by an ergonomically designed, elongate, rigid handle member having opposite ends and one or more cords extending through the handle member for carrying the harvested game. The multi-purpose tool function of the wild game tote is provided by hunting tools that are detachably mounted on both ends of the handle member such as a scale for weighing the harvested game, or a blade-sharpening stone for sharpening a hunter's knife. The tote also has hash markings on the handle member that denote the measurement of length.

16 Claims, 2 Drawing Sheets

(56) References Cited

U.S. PATENT DOCUMENTS

| | | | |
|---|---|---|---|
| 4,243,164 A | | 1/1981 | Burlison et al. |
| 4,363,147 A | * | 12/1982 | Deweese .................. B25F 1/00 |
| | | | 7/158 |
| 4,730,863 A | * | 3/1988 | Guadnola ............... A45F 5/102 |
| | | | 294/142 |
| 4,763,942 A | | 8/1988 | Lyon |
| D312,164 S | | 11/1990 | Pierotti |
| 5,901,999 A | * | 5/1999 | Brock ................... A01M 31/00 |
| | | | 294/137 |
| 5,951,080 A | | 9/1999 | Wessner |
| 5,986,222 A | * | 11/1999 | Heiberg ................. G01G 19/14 |
| | | | 177/148 |
| D486,879 S | | 2/2004 | Powell et al. |
| 6,923,356 B2 | * | 8/2005 | Reynolds ............... B60R 7/043 |
| | | | 224/604 |
| 7,125,331 B1 | * | 10/2006 | Sayers .................... A22B 5/06 |
| | | | 452/189 |
| 9,990,882 B2 | | 4/2018 | Owen |
| 9,999,232 B1 | * | 6/2018 | Poland .................... A22B 5/06 |
| 2002/0108978 A1 | * | 8/2002 | Koxlien ............. A01M 31/006 |
| | | | 224/264 |
| 2012/0043357 A1 | | 2/2012 | Campbell |
| 2016/0050906 A1 | * | 2/2016 | Owen ....................... A45F 5/00 |
| | | | 24/3.13 |
| 2017/0355086 A1 | * | 12/2017 | Lee ....................... B26B 11/006 |

\* cited by examiner

WILD GAME TOTE WITH INTERCHANGEABLE HUNTING TOOLS

BACKGROUND OF THE INVENTION

The present invention relates to hunting accessories, and more specifically to a wild game tote for carrying wild game animals such as birds, small mammals and fish, and especially turkeys.

Hunting wild game such as turkeys, upland game birds like pheasants, grouse, partridge and quail, as well as waterfowl like ducks and geese, and small mammals like rabbits and squirrels is a popular sport. However, after harvesting wild game, a sportsman must carry the carcass out from the location where it was taken, which typically may be a relatively remote area of wilderness or forest land. Carrying the carcass of small wild game such as pheasants, grouse, quail, rabbits, and squirrels, is not particularly arduous because by definition such game is small and lightweight. However, transporting larger wild game carcasses such as geese and turkeys, which typically weigh between 10 to 30 pounds, is a different and more difficult task for the sportsman. Traditionally, a sportsman may attempt to carry game by simply grasping the legs or the head of the turkey or goose with one hand and sling the bird over one shoulder to carry it. Since a typical wild turkey or goose can weigh between 10 to 30 pounds, transporting a turkey or goose in this manner can become relatively strenuous and fatiguing, especially over long distances. Further, when carrying a wild turkey in this manner, it is not uncommon for the sportsman's fingers or hand to be stuck by the turkey's spurs.

If a wild turkey harvested by a sportsman is of a trophy character, the sportsman will want to preserve the turkey carcass as much as possible. Consequently, the sportsman will desire to transport the turkey carcass with minimal damage to its tail feathers, body, beard and head. It thus becomes important to prevent the turkey carcass from being dragged across the ground, and to keep it from being damaged by other equipment being carried by the sportsman, such as a backpack or shotgun.

Also, after harvesting a wild turkey, a sportsman will typically desire to record various physical characteristics of the turkey, especially if the sportsman believes the turkey is of trophy character. A turkey's weight, length of spurs, and length and width of its beard are all important attributes for determining whether the turkey might be considered a trophy worthy of displaying by a sportsman.

There are many different types of wild turkey carriers known in the art. See, for example, the carriers illustrated and described in U.S. Pat. No. 9,930,882, US Patent Publication No. 2002/0108978 and US Patent Publication No. 2012/0043357.

SUMMARY OF THE INVENTION

A multi-functional wild game tote that functions not only as a lightweight, convenient and compact carrier for one or more game animals such as birds, small mammals and fish harvested in the wild, but also as a multi-purpose tool having numerous interchangeable hunting tools useful when hunting and harvesting wild game animals, especially wild turkeys. The wild game tote can be easily folded up and placed in a pocket of a hunting vest, coat or backpack so as to be ready for use by a sportsman when a wild game animal is harvested.

The carrier function of the wild game tote is provided by an ergonomically designed, elongate, rigid handle member having opposite ends and a central finger grip portion therebetween. A central hole extends perpendicularly through the handle member's longitudinal axis at a location that is intermediate, preferably half-way, between the opposite ends of the handle member. A center cord extends through the central hole and has a slip noose at the lower end thereof which is disposed beneath the handle member, and a loop at the upper end thereof which is disposed above the handle member. When used to carry a bird or small mammal, the slip noose is placed either around the head and neck of an animal carcass or around the feet and legs of the animal carcass, and when used to carry a fish the slip noose is placed around the tail of the fish. When a sportsman lifts the handle member, the noose is self-tightening under the weight of the suspended carcass and thus binds tightly about the animal to enable the animal carcass to be carried in the traditional over the shoulder position or at arm's length.

In a preferred embodiment, there are multiple spaced cords disposed along the length of the handle member for hanging game. In addition to the center cord, a pair of outer cords, one disposed on each side of the center cord, may be employed to carry game. Also, in another preferred embodiment, a detachable shoulder strap may be attached to the loop at the upper end of the center cord so that the weight of the animal, especially when carrying a turkey, may be supported by a sportsman's shoulder. The use of a shoulder strap enables the carrier to be easily placed over hunting vests and coats, and provides a more comfortable position for carrying game, especially if the carrier is being used to transport multiple animal carcasses.

The multi-purpose tool function of the wild game tote is provided by several hunting tools mounted on both ends of the handle member which are specifically adapted for use when hunting wild game such as birds, small mammals and fish, especially wild turkeys. The handle member is also etched with hash markings along its length that denote the measurement of length or distance. These hash markings are etched into the handle member at one inch intervals, one-half inch intervals, and one-quarter inch intervals and are used to measure, for example, the length of fish, the length and width of a turkey's beard, and the length of a turkey's spurs.

In a first embodiment, the handle member has a hunting tool at one end comprised of an integral scale for weighing the harvested game, and has a mounting arrangement for detachably coupling other hunting tools thereto at the opposite end of the handle member. For example, one detachably mounted hunting tool might be a blade-sharpening stone for sharpening a sportsman's knife to facilitate field dressing the harvested game. Various other hunting tools useful to a sportsman that might be detachably connected to the coupling end of the handle member include a knife blade, a compass, a fleshing tool, a screwdriver, a bottle opener, a wrench, a pry bar, a hammer, a saw blade, or a hatchet. In one embodiment, the detachable tool mounting arrangement comprises a threaded connection having male threads on one of either the handle member or the tool, and female threads on the other of said tool or handle member. Thus, a hunting tool would be screwed into the end of the handle member and could be interchangeable with another hunting tool by simply unscrewing the tool from the end of the handle member, and replacing it with another tool which, in turn, is threaded into the end of the handle member.

DETAILED DESCRIPTION OF THE INVENTION

Figure 1:
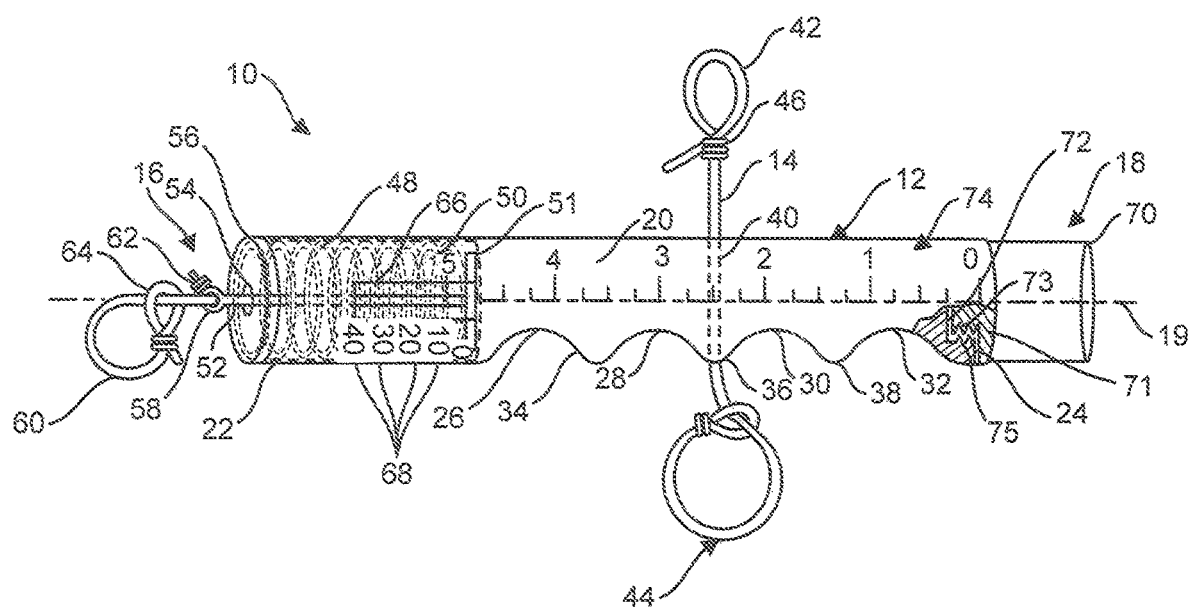
FIG. 1 is a front perspective view of a wild game tote constructed in accordance with the present invention with one end thereof shown in partial section to illustrate a first embodiment of the detachable tool mounting arrangement.

Referring now to FIG. 1 of the drawings, there is illustrated a wild game tote, generally designated by the number 10, in accordance with one embodiment of the present invention. The wild game tote 10 is multi-functional as it can be used not only as a lightweight, convenient, and compact wild game carrier for relatively small game animals such as birds, small mammals and fish harvested by a sportsman in the wild, but also can be used as a multi-purpose tool having interchangeable hunting tools useful to a sportsman when hunting and harvesting wild game, especially wild turkeys.

As used herein, the term "wild game" refers to relatively small game animals. Relatively small game animals are typically animals such as birds, mammals and fish that weigh up to about 30 pounds, and are harvested with weapons such as rifles, shotguns, and bows, or rods and reels. Typical examples of small game animals thus include mammals such as rabbits, raccoons, hares and squirrels, and birds such as pheasants, grouse, quail, ducks, geese, partridge, doves, snipe, woodcock and turkeys, and fish such as walleye, bass and pike. Although the wild game tote 10 of the present invention could conceivably also be used with other small animals such as amphibians, invertebrates and reptiles, it is primarily directed toward use with the above-mentioned birds, small mammals and fish.

As used herein, the term "hunting tool" or "tool" refers to relatively small, hand-held tools that are useful to a sportsman when hunting and harvesting wild game. Thus, as used herein, hunting tools include, for example, a scale for weighing the harvested game, a blade-sharpening stone for sharpening a sportsman's knife, a knife blade, a compass, a fleshing tool, a screwdriver, a bottle opener, a wrench, a pry bar, a hammer, a saw blade, or a hatchet.

As shown in FIG. 1, the wild game tote 10 includes a handle member 12, a center cord 14 for hanging wild game, and hunting tools 16 and 18 mounted on opposite ends of handle member 12 as its primary components. Handle member 12 is an elongate, rigid, rod-like member defining a central longitudinal axis 19 and having a length of about five to ten inches, preferably about six inches, and a cylindrical cross section at its opposite ends 22 and 24 having a diameter of about one inch. Handle member 12 may be composed of wood, metal or plastic, but is preferably metal as illustrated, and has a central finger grip portion 20 located between the opposite outer ends 22 and 24. Finger grip portion 20 has a smooth arcuate-shaped outer surface on its upper or top side, and has a scallop-shaped edge on its lower or bottom side with four semi-circular finger-receiving recessed curves or indentations 26-32. In turn, the finger-receiving indentations 26-32 define three crests 34-38 each having a cross sectional diameter perpendicular to longitudinal axis 19 that is equal to the cross sectional diameters of the outer ends 22 and 24. The finger grip portion 20 also has a central hole 40 extending perpendicularly through the longitudinal axis 19 from its upper side to its lower side at a location intermediate between the opposite ends 22 and 24 of handle member 12. Preferably, as shown in FIG. 1, the central hole 40 is located half-way between ends 22 and 24, and exits the lower side of handle member 12 through crest 36.

Center cord 14 is about ten to about twenty inches in total length, preferably about sixteen inches in total length, and is dimensioned to allow it to slidably extend through central hole 40. Center cord 14 has a loop 42 at its upper end which, as shown in FIG. 1, is disposed above handle member 12. Cord 14 also has a slip noose 44 at its lower end which is disposed beneath handle member 12. When used to carry a bird or small mammal, the slip noose 44 is placed either around the head and neck of the animal carcass or around the feet and legs of the animal carcass. When used to carry a fish, the slip noose 44 is placed around the tail of the fish. When a hunter lifts the handle member 12, the noose 44 is self-tightening under the weight of the suspended carcass, and thus binds tightly about the animal enabling the animal carcass to be carried in the traditional over the shoulder position or at arm's length. Cord 14 may be composed of any suitable material, such as rope, nylon, paracord, leather or wire, having sufficient strength to hang a thirty pound game animal without breaking. A knot 46 in cord 14 having a size larger than the diameter of central hole 40, and located adjacent loop 42, prevents cord 14 from passing through central hole 40.

The hunting tools 16 and 18 located at opposite ends 22 and 24, respectively, of handle member 12 are specifically adapted for use by a hunter when hunting wild game, such as birds, small mammals and fish, especially wild turkeys. As shown in FIG. 1, hunting tool 16 comprises a scale for weighing the harvested game. More specifically, the scale includes a 0-40 pound calibrated coil spring 48 located within a hollowed out cavity 50 formed axially in the outer end 22 of handle member 12. A plate 51 disposed perpendicular to axis 19 bears against the inner end of spring 48, and is connected to the inner end of a rod 52 which extends axially through the center of coil spring 48 and projects from an opening 54 of a cap 56. Cap 56 is threaded onto the outer end 22 of handle member 12 to close the outer end of cavity 50 and thereby hold coil spring 48 within cavity 50 by bearing against the outer end of coil spring 48. Rod 52 has an eyelet 58 at its outer end which projects from cap 56 and to which the inner end of a line 60 is attached by a knot 62. Line 60 is similar in composition to center cord 14, and has a slip noose 64 at its outer end. A rectangular-shaped viewing window 66 is formed in one side of handle member 12 between the end 22 and grip portion 20 of handle member 12 at the location of cavity 50. Window 66 provides an opening in handle member 12 that extends radially between the outer surface of handle member 12 and cavity 50, and extends longitudinally parallel to axis 19 of handle member 12. Hash markings 68 are etched in the outer surface of handle member 12 adjacent window 66 that denote weight. The hash markings 68 illustrated in FIG. 1 indicate five pound increments between zero and forty pounds. However, any desired incremental markings may be used such as one-half or one pound increments if a more precise weight measurement is desired. The hash markings 68 are spaced along the side of window 66 at intervals which match with the degree of compression of the pre-calibrated coil spring 48 for accuracy in weighing wild game.

In order to weigh a game carcass, a hunter places the slip noose 64 of line 60 over the head or legs of the carcass, or around the tail of a fish. The hunter then raises the handle member 12 vertically with the end 22 pointed downwardly. The weight of the game carcass then self-tightens the slip noose 64 and compresses spring 48 so that plate 51 moves toward cap 56 and can be seen by the hunter through window 66. The hunter then simply matches up or aligns the location of the plate 51 with one of the hash markings 68, and records the weight of the game carcass.

As noted above, various hunting tools can be detachably mounted to the opposite end 24 of handle member 12, but for illustration purposes, the hunting tool 18 shown in FIG. 1 at the end 24 of handle member 12 comprises a knife-sharpening stone 70. Stone 70 is cylindrical in shape and is about one inch long by about seven-eighths of an inch in diameter. The inner end of stone 70 is attached to a cylindrical base member 71 which in turn is received within a cylindrical recess 72 formed coaxially with axis 19 in the end 24 of handle member 12. Stone 70 is integrally attached to base member 71 in any appropriate manner, such as by adhesive, and is detachably retained within recess 72 via a threaded mounting arrangement hereinafter to be described. The outer end of stone 70 projects a distance of about one-half to three fourths of an inch from end 24 of handle member 12. Thus, a portion of the length of stone 70 is within recess 72 so that it and the base member 71 provide a secure mount to handle member 12, and a sufficient portion of the length of stone 70 projects from end 24 to provide an adequate surface for sharpening a knife blade. Stone 70 is composed of a natural oil stone such Ozark Novaculite or silicone quartz, also known as Arkansas Stone. However, stone 70 may also be composed of an aluminum oxide man-made oil stone, a silicon carbide oil stone, or a diamond stone.

As illustrated in FIG. 1 and noted previously herein, the end 24 of handle member 12 includes a mounting arrangement for detachably coupling a hunting tool thereto. This detachable tool mounting arrangement includes male threads 73 formed in the outer surface of base member 71, and matching female threads 75 formed on the inner surface of recess 72. Thus, in order to attach or couple stone 70 to handle member 12, the base member 71 is received within recess 72 and then turned in a clockwise direction until threads 73 engage threads 75. Base member 71 is turned until tightly mounted to handle member 12 providing a rigid connection. To remove or uncouple stone 70 so that another different hunting tool may be attached to handle member 12, the reverse procedure is performed, i.e. stone 70 is turned counterclockwise until threads 73 and 75 disengage from each other whereupon stone 70 may be removed from handle member 12.

As shown in FIG. 1, handle member 12 is also etched with hash markings 74 along its side that denote length or distance in inches. These hash markings 74 are etched into the handle member 12 at one inch intervals, one-half inch intervals, and one-quarter inch intervals and are used to measure, for example, the length of a fish, the length and width of a turkey's beard and the length of a turkey's spurs. The length and thickness of the beard of a wild turkey, as well as the length of its spurs, are measured by a hunter to determine whether the turkey might be considered a trophy bird. The beard is a very distinguishable feature of wild turkeys and is the black fibrous hairs that hang down from the chest away from the body plumage that can vary in length and thickness. A spur is the long talon or claw on the back of a turkey's leg just above the turkey's foot, and ranges in color from black, gray or pink.

Figure 2:
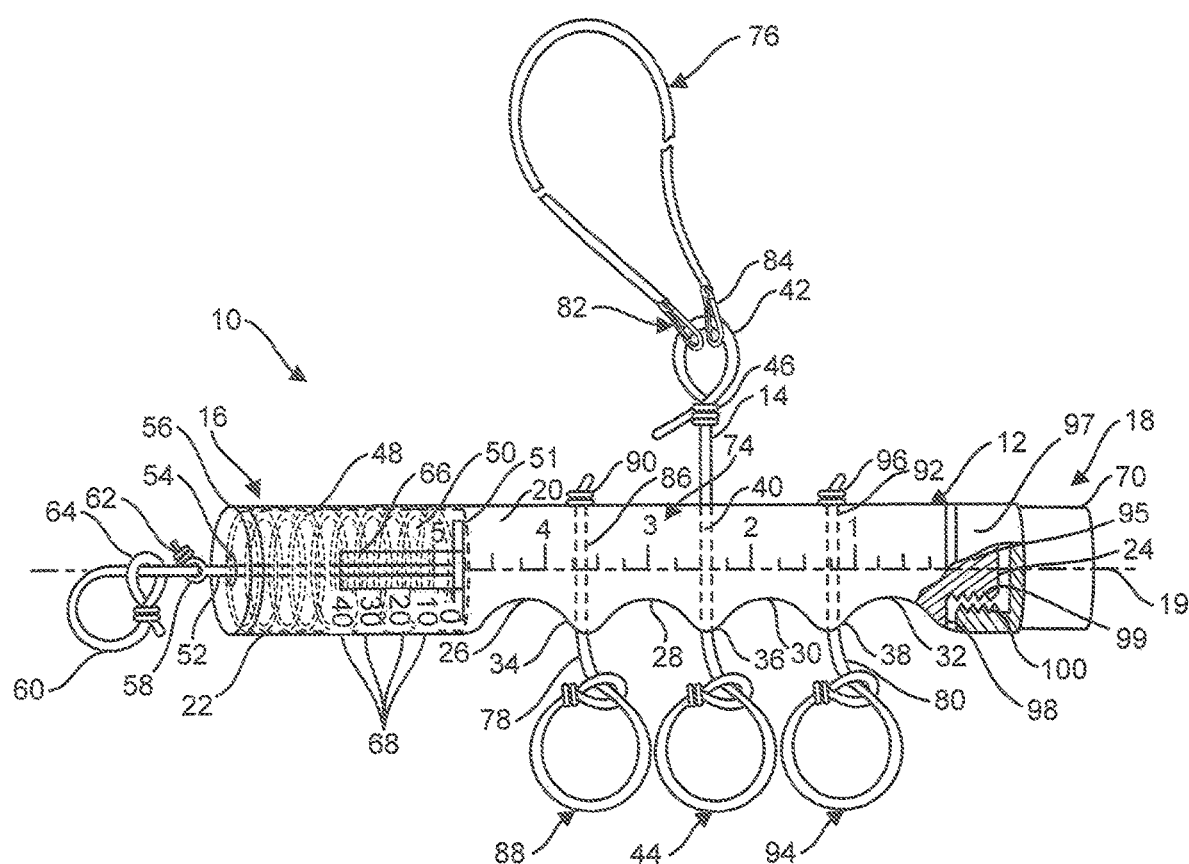
FIG. 2 is a front perspective view of a second embodiment of the wild game tote incorporating multiple cords for hanging game and a detachable shoulder strap with one end thereof shown in partial section to illustrate a second embodiment of the detachable tool mounting arrangement.

Referring now to FIG. 2, there is illustrated a second embodiment of the present invention. In addition to the elements of tote 10 shown in FIG. 1 and described above, which elements are also shown in FIG. 2 using the same numbers, this second embodiment includes an elongate shoulder strap 76 and two additional cords 78 and 80 for hanging wild game from handle member 12. Shoulder strap 76 is composed of any suitable material, such as nylon or leather, and is approximately thirty to forty inches long, preferably about thirty six inches in length. Strap 76 is detachably connected to the loop 42 of center cord 14 by means of a pair of spring clips 82 and 84. In addition, strap 76 may have a shoulder pad (not shown) thereon to help distribute the force of the weight of a carried animal, especially a carried turkey, about a larger surface area of the hunter's shoulder than the strap 76 by itself. Thus, strap 76 provides a means for carrying game such as a turkey in a more effective and convenient manner than using the handle member 12 alone.

Cords 78 and 80 are similar in construction to center cord 14 and are used in a manner similar to center cord 14 for suspending wild game from handle member 12. Accordingly, finger grip portion 20 of handle member 12 has an outer bore 86 extending perpendicularly through the longitudinal axis 19 from its upper side to its lower side at a location between central hole 40 and the outer end 23 of handle member 12. Preferably, bore 86 exits the lower side of handle member 12 through crest 34 of grip portion 20.

Cord 78 is about ten to about twenty inches in total length, preferably about twelve inches in total length, extends through bore 86, and has a slip noose 88 at its lower end which is disposed beneath handle member 12. When used to carry a bird or small mammal, the slip noose 88 is placed either around the head and neck of an animal carcass or around the feet and legs of the animal carcass. When used to carry a fish, the slip noose is placed about the tail of the fish. When a hunter lifts the handle member 12, the slip noose 88 is self-tightening under the weight of the suspended animal carcass, and thus binds tightly about the animal enabling the animal carcass to be carried in the traditional over the shoulder position or at arm's length. Cord 78 may be composed of any suitable material, such as rope, nylon, paracord, leather or wire, having sufficient strength to hang a thirty pound game animal without breaking. A knot 90 in cord 78 has a size larger than the diameter of bore 86, and is located at the upper end of cord 78 above handle member 12. Knot 90 prevents cord 78 from passing through bore 86 under the weight of an animal carcass.

In FIG. 2, finger grip portion 20 of handle member 12 also has an outer aperture 92 extending perpendicularly through the longitudinal axis 19 from its upper side to its lower side at a location between central hole 40 and outer end 24 of handle member 12. Preferably, aperture 92 exits the lower side of handle member 12 through crest 38 of grip portion 20.

Cord 80 is about ten to about twenty inches long, preferably about twelve inches in total length, extends through aperture 92, and has a slip noose 94 at its lower end which is disposed beneath handle member 12. When used to carry a bird or small mammal, the slip noose 94 is placed either around the head and neck of an animal carcass or around the feet and legs of the animal carcass. When used to carry a fish, the slip noose is placed about the tail of the fish. When a hunter lifts the handle member 12, the slip noose 94 is self-tightening under the weight of the suspended carcass and thus binds tightly about the animal enabling the animal carcass to be carried in the traditional over the shoulder position or at arm's length. Cord 80 may be composed of any suitable material, such as rope, nylon, paracord, leather or wire, having sufficient strength to hang a thirty pound game animal without breaking. A knot 96 in cord 80 has a size larger than the diameter of aperture 92, and is located at the upper end of cord 80 above handle member 12. Knot 96 prevents cord 80 from passing through aperture 92 under the weight of an animal carcass.

As noted above, various hunting tools can be detachably mounted to the opposite end 24 of handle member 12 of this second embodiment of the wild game tote 10. However, for illustration purposes, the hunting tool 18 shown in FIG. 2 at the end 24 of handle member 12 is once again illustrated as a knife-sharpening stone 70, but in this second embodiment the inner end of stone 70 is attached to an annular-shaped base member 97 which in turn is received within an annular-shaped recess 98 formed coaxially with axis 19 in the end 24 of handle member 12 by a longitudinally projecting cylindrical key member 95. Stone 70 is integrally attached to base member 97 in any appropriate manner, such as by adhesive, and is detachably retained within recess 98 via a threaded mounting arrangement hereinafter to be described. The outer end of stone 70 projects a distance of about one-half to three fourths of an inch from end 24 of handle member 12. Thus, a portion of the length of stone 70 is within recess 98 so that stone 70, the base member 97, and key member 95 combine to provide a secure mount to handle member 12, and a sufficient portion of the length of stone 70 projects from end 24 to provide an adequate surface for sharpening a knife blade. Stone 70 is composed of a natural oil stone such as Ozark Novaculite or silicone quartz, also known as Arkansas Stone. However, stone 70 may also be composed of an aluminum oxide man-made oil stone, a silicon carbide oil stone, or a diamond stone.

The second embodiment of the wild game tote 10 shown in FIG. 2 also illustrates an alternate embodiment of the mounting arrangement for detachably coupling a hunting tool to handle member 12. This alternate detachable tool mounting arrangement includes male threads 99 formed in the outer surface of key member 95, and matching female threads 100 formed on the inner surface of annular base member 97. Thus, in order to attach or couple stone 70 to the end 24 of handle member 12, the base member 97 is received within recess 98 and then turned in a clockwise direction until threads 100 engage threads 99. Base member 97 is turned until tightly mounted to key member 95 of handle member 12 providing a rigid connection. To remove or uncouple stone 70 so that another different hunting tool may be attached to handle member 12, the reverse procedure is performed, i.e. stone 70 is turned counterclockwise until threads 99 and 100 disengage from each other whereupon stone 70 may be removed from handle member 12.

Although hunting tool 16 is illustrated in both FIGS. 1 and 2 as being a scale integrally formed in the end 22 of handle member 12, it is apparent that the scale could be formed as a detachable hunting tool. Such may be accomplished by using either the threaded detachable tool mounting arrangement of FIG. 1 or FIG. 2, and mounting the scale to a base member such as 71 or 97. Tote 10 thus provides a multi-purpose tool having readily interchangeable hunting tools for a sportsman.

I claim:

1. A multi-functional wild game tote, comprising:
   an elongate, rigid handle member having opposite ends and a central finger grip portion therebetween, said handle member having a longitudinal axis and a central hole extending perpendicularly through said longitudinal axis at a location intermediate between the opposite ends of said handle member;
   a center cord extending through the central hole in said handle member, said center cord having a loop at its upper end which is disposed above said handle member and a slip noose at its lower end which is disposed beneath said handle member;
   a hunting tool detachably mounted on one or both of the opposite ends of said handle member; and
   a mounting arrangement on one or both of the opposite ends of said handle member for detachably coupling said hunting tool to said one or both of the opposite ends of said handle member, said mounting arrangement comprising a cylindrical base member having an inner face and an outer face, said inner face and said outer face disposed transversely with respect to the longitudinal axis of said handle member, an elongate key member projecting from the inner face of said base member at a central location that coincides with the longitudinal axis of said handle member, said key member having an outer cylindrical surface, a cylindrical key-receiving recess formed in one of the ends of said handle member, said recess having an inner cylindrical surface, said hunting tool mounted to the outer face of said base member, and threads formed in the outer cylindrical surface of said key member that engage threads formed in the inner cylindrical surface of said recess to couple or decouple said base member and tool with said handle member.

2. The wild game tote of claim 1, wherein one of said hunting tools comprises a scale for weighing harvested wild game.

3. The wild game tote of claim 2, wherein said scale comprises a calibrated coil spring disposed within one end of said handle member.

4. The wild game tote of claim 3, wherein said handle member includes a window formed therein, and hash markings spaced adjacent said window at intervals which match with the degree of compression of the calibrated coil spring to indicate weight.

5. The wild game tote of claim 1, wherein one of said hunting tools comprises a blade-sharpening stone.

6. The wild game tote of claim 5, wherein said blade-sharpening stone comprises an oil stone or a diamond stone.

7. The wild game tote of claim 1, wherein said handle member is etched with hash markings along its length that denote length.

8. The wild game tote of claim 1, wherein said handle member includes a plurality of through holes disposed at spaced intervals along its length, and a corresponding number of cords extending through said holes each cord having at least a slip noose at its lower end for carrying harvested wild game.

9. The wild game tote of claim 8, wherein said harvested wild game comprises a bird, a small mammal, or a fish.

10. The wild game tote of claim 1, further comprising a detachable shoulder strap having one or more clips for attachment to the loop at the upper end of the center cord.

11. The wild game tote of claim 1, wherein the hunting tool on one end of said handle member comprises a scale for weighing harvested wild game, and the hunting tool on the opposite end of said handle member comprises a blade-sharpening stone.

12. A multi-functional wild game tote, comprising:
   an elongate, rigid handle member having opposite ends and a central finger grip portion therebetween, said handle member having a longitudinal axis and a central hole extending perpendicularly through said longitudinal axis at a location intermediate between the opposite ends of said handle member;
   a center cord extending through the central hole in said handle member, said center cord having a loop at its upper end which is disposed above said handle member and a slip noose at its lower end which is disposed beneath said handle member;

a hunting tool detachably mounted on one or both of the opposite ends of said handle member; and a mounting arrangement on one or both of the opposite ends of said handle member for detachably coupling said hunting tool to said one or both of the opposite ends of said handle member, said mounting arrangement comprising a cylindrical base member having an inner face and an outer face, said inner face and said outer face disposed transversely with respect to the longitudinal axis of said handle member, an elongate key member projecting from one end of said handle member at a central location that coincides with the longitudinal axis of said handle member, said key member having an outer cylindrical surface, a cylindrical key-receiving recess formed in the inner face of said base member, said recess having an inner cylindrical surface, said hunting tool mounted to the outer face of said base member, and threads formed in the outer cylindrical surface of said key member that engage threads formed in the inner cylindrical surface of said recess to couple or decouple said base member and tool with said handle member.

13. The wild game tote of claim 12, wherein one of said hunting tools comprises a scale for weighing harvested wild game.

14. The wild game tote of claim 12, wherein one of said hunting tools comprises a blade-sharpening stone.

15. The wild game tote of claim 12, wherein the hunting tool on one end of said handle member comprises a scale for weighing harvested wild game, and the hunting tool on the opposite end of said handle member comprises a blade-sharpening stone.

16. The wild game tote of claim 12, wherein said hunting tool comprises a scale, a blade-sharpening stone, a knife blade, a compass, a fleshing tool, a screwdriver, a bottle opener, a wrench, a pry bar, a hammer, a saw blade, or a hatchet.

* * * * *